United States Patent [19]
Johnk

[11] 3,716,578
[45] Feb. 13, 1973

[54] HEXAHYDROPHENANTHRENE DERIVATIVES

[75] Inventor: Poul Johnk, Vaerlose, Denmark

[73] Assignee: Novo Terapeutisk Laboratorium A/S, Copenhagen, Denmark

[22] Filed: March 18, 1970

[21] Appl. No.: 20,819

[30] Foreign Application Priority Data

April 3, 1969 Great Britain.....................17,637/69

[52] U.S. Cl.......260/488 CD, 260/345.9, 260/618 F,
260/611 F, 260/543, 260/463, 260/619 F,
260/556 AR, 260/613 R, 260/999, 260/611 A

[51] Int. Cl..............................................C07c 69/02

[58] Field of Search.....260/613 R, 611 F, 610 F, 488 CD, 260/611 A

[56] References Cited

UNITED STATES PATENTS

| | | | |
|---|---|---|---|
| 2,494,253 | 1/1950 | Miescher et al.............. | 260/613 R X |
| 2,938,056 | 5/1960 | Nathan et al................. | 260/613 R X |
| 3,275,691 | 9/1966 | Goldberg et al. ........... | 260/613 R X |

FOREIGN PATENTS OR APPLICATIONS

| | | | |
|---|---|---|---|
| 103,183 | 11/1965 | Denmark ......................... | 260/618 F |

Primary Examiner—Bernard Helfin
Attorney—Synnestvedt & Lechner

[57] ABSTRACT

Novel hexahydrophenanthrene derivatives of the general formula

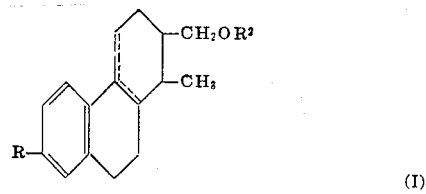

(I)

in which R is hydrogen or $OR^1$; $R^1$ is hydrogen, benzyl, lower alkyl or cycloalkyl; $R^2$ is hydrogen, lower alkyl, cycloalkyl, cycloalkyl containing a hetero atom, or $OCR^3$; $R^3$ is hydrogen, lower alkyl or $CH_2SO_2X$; X is chlorine, $OR^4$,

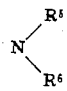

or OMe; $R^4$ is hydrogen or lower alkyl; $R^5$ and $R^6$ are hydrogen or lower alkyl, or $R^5$ and $R^6$ together with the attached N-atom form a heterocyclic ring; and Me is an alkali metal or an earth alkali metal atom, useful anti-fertility compositions for oral administration, as well as processes for their production.

3 Claims, No Drawings

HEXAHYDROPHENANTHRENE DERIVATIVES

The present invention relates to novel hexahydrophenanthrene derivatives and a process for their preparation. The invention also relates to the use of the said hexahydrophenanthrene derivatives as anti-fertility compositions for oral administration and to the use of the said derivatives as intermediates for the preparation of other derivatives within the scope of the present invention.

Thus, the invention provides novel hexahydrophenanthrene derivatives having the general formula

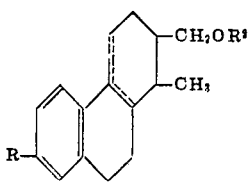

(I)

in which R is hydrogen or OR¹; R¹ is hydrogen, benzyl, lower alkyl or cycloalkyl; R² is hydrogen, lower alkyl, cycloalkyl, cycloalkyl containing a hetero atom, or OCR³; R³ is hydrogen, lower alkyl or CH₂SO₂X; X is chlorine, OR⁴,

or OMe; R⁴ is hydrogen or lower alkyl; R⁵ and R⁶ are hydrogen or lower alkyl, or R⁵ and R⁶ together with the attached N-atom form a heterocyclic ring; and Me is an alkali metal or an earth alkali metal atom.

In particular, the invention relates to 1,2,3,4,9,10-hexahydrophenanthrene derivatives corresponding to the above formula (I) in which R is OR¹, R¹ being a lower alkyl group, especially a methyl group.

In the above and in the following the term "lower alkyl" refers to alkyl groups preferably having one to six carbon atoms.

According to the invention it has been found that compounds of the formula (I) have valuable pharmacological properties, in particular an oral anti-fertile post-coital effect combined with a low estrogenic activity. Thus, compounds of the formula (I) may be used as the active ingredient in anti-fertility compositions for post-coital oral administration.

Furthermore, compounds of the formula (I) may be used as intermediates for preparing other compounds also within the scope of the formula (I).

A valuable compound within the scope of the invention is 1-methyl-2-hydroxymethyl-7-methoxy-1,2,3,4,9,10-hexahydrophenanthrene as well as derivatives thereof within the scope of the general formula (I), e.g., the acetate, the tetrahydropyranyl ether and the sulfodiethylamideacetate thereof.

According to the invention the hexahydrophenanthrene derivatives of the general formula (I) in which R and R² are as defined above may be prepared by reducing the carbonyl group in a compound of the general formula

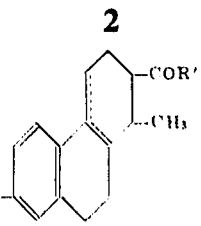

(II)

in which R is as defined above, R' is hydrogen, hydroxyl, chlorine, bromine, OAlk or OMe, Alk is a lower alkyl group, and Me is an alkali metal or an earth alkali metal atom, whereafter, if desired, the reaction product of the formula

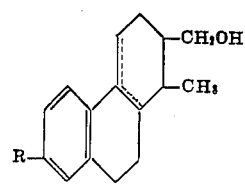

(III)

in which R is as defined above, is converted into a compound of the general formula (I) in which R² is different from hydrogen.

In accordance with the invention it is particularly preferred to reduce a 2-carboethoxy compound of the formula

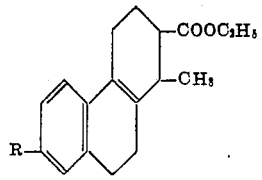

(IV)

in which R is as defined above, preferably by reducing 1-methyl-2-carboethoxy-7-methoxy-1,2,3,4,9,10-hexahydrophenanthrene whereafter, if desired, the resulting 1-methyl-2-hydroxymethyl-7-methoxy-1,2,3,4,9,10-hexahydrophenanthrene of the formula

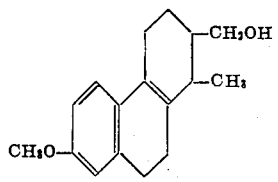

is converted into an acetate, a tetrahydropyranyl ether or a sulfodiethylamideacetate thereof.

The starting compound for the above process aspect may be prepared in analogy with J.A.C.S., 70, 161 (1948) and furthermore as described in Example 1 A.

The invention is illustrated in the following examples.

EXAMPLE 1

A. Preparation of 1-methyl-2-carboethoxy-7-methoxy-1,2,3,4,9,10-hexahydrophenanthrene.

16 g of 3-methyl-2-(m-methoxyphenethyl)-4-carboethoxy-cyclohexene-2-on-1 (boiling point 174°–176° C/0.2 mm Hg) dissolved in 50 ml of 96 percent ethanol were hydrogenated in a Parr-apparatus at 35 p.s.i. for 15 minutes. 1.96 g of Pd/C were used as a catalyst. After filtration 16 g of an oil were obtained by evaporation.

The said oil was pre-cooled to −20° C, and there were then added 39 ml of concentrated sulphuric acid having a temperature of −20° C. The reaction mixture was stirred, and at the same time the temperature was allowed to rise to 10° C during half an hour. The mixture was then poured into ice water. Following extraction with ether the ether phase was dried over magnesium sulphate. After filtration and evaporation there were obtained 13 g of an oil which was chromatographed on 800 g of kiesel gel with benzene as the eluent. After recrystallization from 96 percent ethanol there were obtained 5.8 g of the title compound with a melting point of 82°–83° C.

IR in KBr: 1720 cm$^{-1}$ (O=C-OC$_2$H$_5$), 1630 cm$^{-1}$ (weak, C=C), 1595 cm$^{-1}$, 1555 cm$^{-1}$ and 1485 cm$^{-1}$ (phenyl).

Analysis: Calculated for C$_{19}$H$_{24}$O$_3$: C = 75.97% H =8.05%

Found: C = 75.91% H =8.01%

B. Preparation of 1-methyl-2-hydroxymethyl-7-methoxy-1,2,3,4,9,10-hexahydrophenanthrene.

600 mg of 1-methyl-2-carboethoxy-7-methoxy-1,2,3,4,9,10-hexahydrophenanthrene, prepared as described above, were dissolved in 3 ml of dry benzene and added dropwise to 10 ml of a 7 percent solution of sodium dihydro-bis-methoxyethoxyaluminate in benzene at room temperature. The reaction mixture was heated to 50° C for half an hour and was then cooled in ice water. Excess of the reducing agent was destroyed with 10 percent hydrochloric acid, and the organic phase was then washed with water. After drying the benzene phase over magnesium sulphate the solvent was evaporated. The remaining oil was crystallized by precipitation from dry benzene. There were obtained a total yield of 195 mg having a melting point of 97°–99° C.

IR in KBr: 3310 cm$^{-1}$ (OH), 1640 cm$^{-1}$ (C=C), 1605 cm$^{-1}$, 1570 cm$^{-1}$ and 1495 cm$^{-1}$ (phenyl).

Analysis: Calculated for C$_{17}$H$_{22}$O$_2$: C= 79.03%, H = 8.58%

Found: C= 78.93% H = 8.37%

EXAMPLE 2

Acetate of 1-methyl-2-hydroxymethyl-7-methoxy-1,2,3,4,9,10-hexahydrophenanthrene.

1.2 g of 1-methyl-2-hydroxymethyl-7-methoxy-1,2,3,4,9,10-hexahydrophenanthrene prepared as described in Example 1 B were added to an ice-cooled mixture of 5 ml of dry pyridine and 2.5 ml of acetic acid anhydride. The mixture was left with stirring for 2 hours.

The reaction mixture was then poured onto ice and 25 ml of ethyl acetate were added. The organic phase was extracted with 2 10 ml portions of 2 N HCl, then with 2 10 ml portions of 2 N NaOH and finally with 10 ml of water. The organic phase was dried over MgSO$_4$ and evaporated to dryness. 1.1 g of a clear oil were hereby obtained. The oil was chromatographed on a column consisting of 50 g of kiesel gel deactivated with 15 percent of water. The eluent was benzene. Hereby 1.0 g of a clear oil was obtained.

IR (film): 1735 cm$^{-1}$ (O=C-CH$_3$), 1640 cm$^{-1}$ (C=C) (weak), 1605 cm$^{-1}$, 1570 cm$^{-1}$ and 1495 cm$^{-1}$ (phenyl), 1245 cm$^{-1}$ (OCH$_3$)

NMR: (approx. 10 percent in CCl$_4$)

0.93 ppm (3H, d, J = 7 Hz

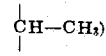

1.98 ppm (3H, s, CH$_3$-COO)
3.72 ppm (3H, s -OCH$_3$)
3.92 ppm (2H, d, J = 8 Hz

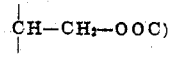

6.5–7.2 ppm (3H, m, phenyl)

In this example and in the following examples the symbols s, d, t, q and m have the following meaning;

s = singlet, d = doublet, t = triplet, q = quadruplet, m = multiplet.

EXAMPLE 3

Tetrahydropyranylether of 1-methyl-2-hydroxymethyl-7-methoxy-1,2,3,4,9,10-hexahydrophenanthrene.

400 mg of 1-methyl-2-hydroxymethyl-7-methoxy-1,2,3,4,9,10-hexahydrophenanthrene, prepared as described in Example 1 B were dissolved in 2 ml of dihydropyran. The reaction in which the tetrahydropyranylether is formed was started by the addition of one drop of phosphorous oxychloride. The reaction mixture was kept at room temperature for 2 hours with stirring and was then poured onto ice. 25 ml of diethylether were added, and the ether solution was then extracted with dilute sodium carbonate solution and water. The organic phase was dried over MgSO$_4$ and evaporated at the lowest possible temperature. Hereby 410 mg of a clear oil were obtained. The oil was chromatographed on a column consisting of 50 g of kiesel gel deactivated with 15 percent of water. 175 mg of the tetrahydropyranylether were hereby isolated in the form of a clear oil.

IR(film): 1120 cm$^{-1}$, 1135 cm$^{-1}$ and 1150 cm$^{-1}$

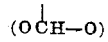

1605 cm$^{-1}$, 1570 cm$^{-1}$ and 1497 cm$^{-1}$ (phenyl), 1245 cm$^{-1}$ (OCH$_3$), 1643 cm$^{-1}$ (C=C) (weak).

NMR (1% CDCl$_3$):

1.02 ppm (3H, d (partly cleaved),

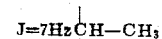

3.92 ppm (3H, s, CH$_3$O-)
4.80 ppm (1H, s,

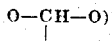

6.9–7.7 ppm (3H, m, phenyl)

EXAMPLE 4

Sulfodiethylamideacetate of 1-methyl-2-hydroxymethyl-7-methoxy-1,2,3,4,9,10-hexahydrophenanthrene.

1.34 ml of chlorosulfoacetylchloride were added to a suspension of 2.6 g of 1-methyl-2-hydroxymethyl-7-methoxy-1,2,3,4,9,10 hexahydrophenanthrene, prepared as described in Example 1B and 1.27 g of dry, pulverized Na$_2$CO$_3$ in 3o ml of dry benzene under ice-cooling. The resulting mixture was then stirred for 2 hours at room temperature.

2.07 ml of dry diethylamine were added dropwise to the resulting solution of the chlorosulfonylacetate which was cooled in an ice-bath. The mixture was left overnight at room temperature and was then filtered. The organic phase was washed with three 25 ml portions of water. The organic phase was dried over MgSO$_4$, filtered and then evaporated to form an oil.

The oil was chromatographed on a column consisting of 200 g of kiesel gel deactivated with 10 percent of water, benzene being used as the eluent. Hereby 1.95 g of the sulfodiethylamideacetate were obtained in the form of a clear oil.

IR (film): 1735 cm$^{-1}$ (O=C-OCH$_2$), 1640 cm$^{-1}$ (weak) (C=C),
  1605 cm$^{-1}$, 1537 cm$^{-1}$ and 1495 cm$^{-1}$ (phenyl), 1335 cm$^{-1}$ and 1195 cm$^{-1}$

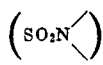

1245 cm$^{-1}$ (OCH$_3$).

NMR (15% CDCl$_3$):
  1.05 ppm (3H, d, J = 7 Hz

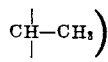

1.27 ppm (6H, t, J = 5 Hz

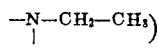

3.46 ppm (4H, q, J = 5 Hz

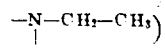

3.93 ppm (3H, s, -OCH$_3$)
  4.10 ppm (2H, s, OOC-CH$_2$-SO$_2$)
  4.34 ppm (2H, d, J = 8 Hz

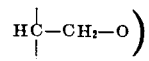

Analysis: Calculated for C$_{23}$H$_{23}$NO$_5$S:
  % C = 63.42; % H = 7.63; % N = 3.22
Found:
  % C = 63.05; % H = 7.58; % N = 3.11

I claim:

1. A hexahydrophenanthrene having the structure

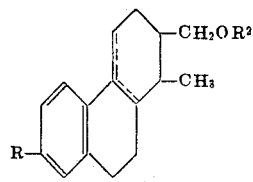

where R is hydrogen or OR$^1$, R$^1$ is hydrogen, benzyl, or lower alkyl and R$^2$ is hydrogen, lower alkyl, or acetyl.

2. 1-methyl-2-hydroxymethyl-7-methoxy-1,2,3,4,9,10-hexahydrophenanthrene.

3. Acetate of 1-methyl-2-hydroxymethyl-7-methoxy-1,2,3,4,9,10-hexahydrophenanthrene.

* * * * *